United States Patent [19]

Rode

[11] Patent Number: 4,526,416
[45] Date of Patent: Jul. 2, 1985

[54] TRUCK BODY COVER

[76] Inventor: Henry J. Rode, 7911 NW. Westside Dr., Kansas City, Mo. 64152

[21] Appl. No.: 567,820

[22] Filed: Dec. 29, 1983

[51] Int. Cl.³ .............................................. B60P 7/04
[52] U.S. Cl. ........................................ 296/100; 70/18
[58] Field of Search ........................ 296/100, 136, 98; 70/18, 65

[56] References Cited

U.S. PATENT DOCUMENTS

| 3,615,117 | 10/1971 | Neidlinger | 296/100 |
| 4,036,521 | 7/1977 | Clenet | 296/100 |
| 4,184,501 | 1/1980 | Johnson | 296/136 |

FOREIGN PATENT DOCUMENTS 596335  4/1960  Canada .............................. 296/100

Primary Examiner—Robert R. Song
Attorney, Agent, or Firm—Schmidt, Johnson, Hovey & Williams

[57] ABSTRACT

A retractable cover is provided with a panel draped over the open top of a cargo-receiving truck body, the panel having a body-surrounding flange provided with a tubular casing which receives a flexible draw-element whose terminal ends are releasably locked to the body. Stretches of the element pass from the casing into a pocketed portion of the panel and thence through a pair of eyelets. Loops on the terminal ends of the element, as well as a ring rigid to the body, receive the shackle of a padlock. In a modified form of lock the loops are unneeded. Snap fasteners secure the flange to the walls of the body.

10 Claims, 6 Drawing Figures

U.S. Patent Jul. 2, 1985 4,526,416
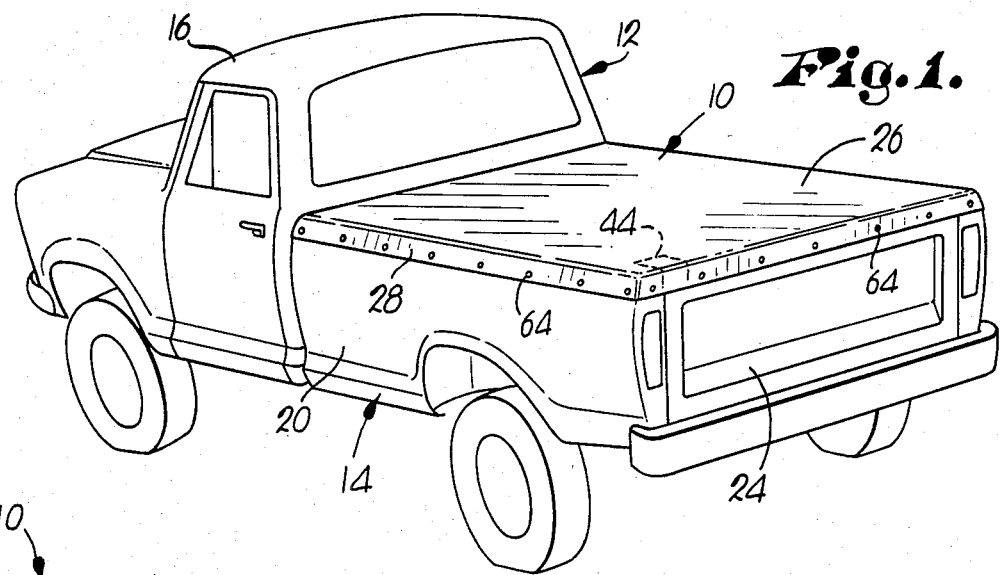
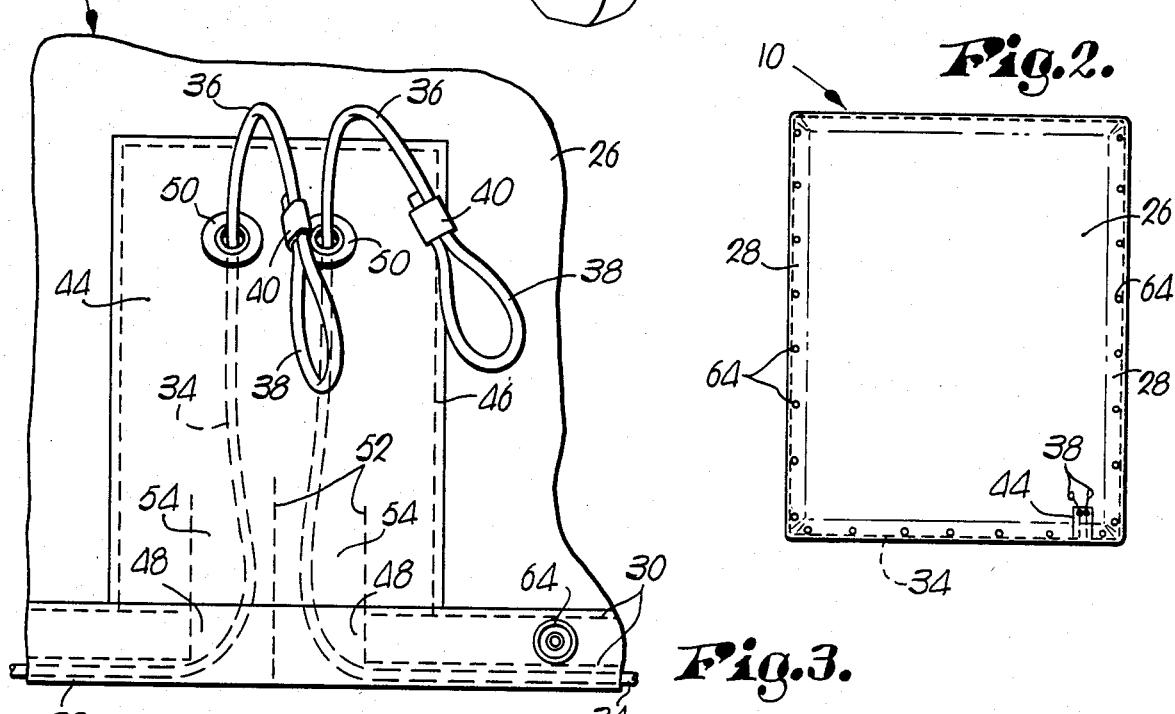
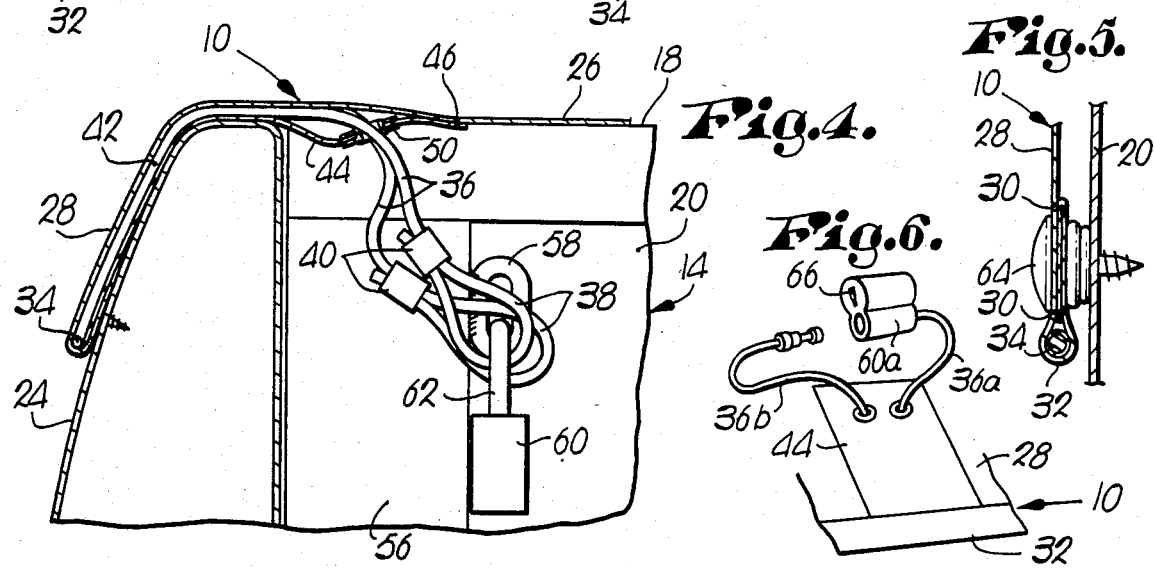

TRUCK BODY COVER

Tarpaulins and other types of protective covers for truck bodies are subject to stealing quickly and easily such that the culprit is seldom apprehended. Once the cover is removed, the contents of the body are exposed and further theft is not uncommon.

In accordance with my invention, therefore, provision is made for locking the cover in place. While it is not contemplated that the locked cover will necessarily protect the contents of the body from pilfering or grand larceny, the locked condition of the cover will at least tend to dissuade the would-be thief from further attempts to so act wrongfully.

The locking of the cover to the body is effected by providing the cover with a flexible, body-encircling draw-element secured to a rigid portion of the body by a padlock.

The terminal ends of the draw-element and the padlock may be located inside the body out of view, thereby tending to dissuade temptation to steal.

Snap fasteners are also provided to attach the cover to the body; therefore, lapse of time expended by the would be felon in attempting to gain access to the interior of the body will likely discourage further efforts by the time he discovers that the cover is locked in place.

In the drawing:

FIG. 1 is a perspective view of a truck having a body provided with a cover made pursuant to my present invention;

FIG. 2 is a plan view of the bottom of the cover removed from the truck body;

FIG. 3 is an enlarged plan view of a portion of said bottom of the cover showing the pocket thereof and the terminal ends of the draw element;

FIG. 4 is an enlarged, fragmentary, vertical cross-sectional view through the cover and through the body at one corner thereof showing the draw element locked to the body;

FIG. 5 is an enlarged, fragmentary, vertical cross-sectional view through the body and through the cover showing one of the snap fasteners; and FIG. 6 is a perspective view showing a modified form of lock.

Chosen for illustration of one use of a cover 10 made according to the instant invention is a pickup truck 12 having a cargo-receiving body 14 behind a cab 16. The body 14 has a normally open top 18, a pair of opposed sidewalls, one only being shown and designated by the numeral 20, a front end wall (not shown) and a rear end wall 24, usually in the form of an end gate adapted to be opened.

The cover 10 has a flexible panel 26 spanning the top 18 thereabove side-to-side and end-to-end of the body 14. The panel 26 has a flange 28 surrounding the side and end walls of the body 14, the flange 28 being turned back on itself and stitched in place at 30, presenting a tubular, body-surrounding casing 32 spaced below the top of the cover 10. The cover 10 may be made from any suitable material such as a waterproof, tarpaulin canvas impregnated with tar, a plastic material or otherwise.

An elongated draw element 34, such as a cable or other stout, flexible member, essentially incapable of being attenuated, extending along the casing 32 therewithin, has a pair of outer stretches 36 disposed in proximal relationship to each other, exteriorly of the casing 32. Each stretch 36 terminates in a loop 38 which may be held closed in any desired manner such as by a wrapping 40.

The panel 26 is provided with a pocket 42 which, as shown, is located at the left, rear corner of the body 14 beneath the panel 26. A relatively small, rectangular piece 44 of flexible material is secured to the inner or bottom face of the panel 26 as by stitching 46 to present the pocket 42, and the casing 32 has spaced ends 48 which communicate with the pocket 42. Portions of the draw element 34 pass from the casing 32 and through the pocket 42 and thence through eyelets 50 in the piece 44 such that the stretches 36 and the loops 38 hang from the piece 44 within the body 14 adjacent the wall 24. Stitching 52 may be provided to partially close the ends 48 and to present channels 54 for the portions of the draw element 34 which pass from the casing 32 into the pocket 42.

Most truck bodies 14 are provided with rigid, reinforcement members such as an upright post 56 at the tailgate 24 and, in accordance with my present invention, a closed ring 58 is welded or otherwise rigidly secured to the post 56 within the body 14 adjacent its top 18. A key-operated padlock 60 has a shackle 62 which receives the ring 58 and the two loops 38. After the draw element 34 is drawn tightly around the body 14, although such "tightness" need not be substantial. As seen in FIG. 4, when the cover 10 is thus locked in place, most of the piece 44, and therefore, the pocket 42 are lapped over the wall 24 with the eyelets 50 disposed inside the body 14 beneath the panel 20.

Desirably, although not necessarily, the flanges 28 are also attached to the body 14 by a plurality of spaced, releasable devices along the casing 32 and the walls 20 and 24 in the nature of snap fasteners 64, each having a part mounted on the corresponding wall and a part attached to the casing 32 just above the draw element 34. After the loops 38 are locked in place the tailgate 24 can be closed and the flange 28 secured thereto by the rear row of fasteners 64.

As an alternative to the loops 38 and the padlock 60 there is shown in FIG. 6 a readily available type of lock 60a permitting rigid connection thereto of one of the stretches 36a and releasable connection thereto of the other stretch 36b after passage of the latter through the ring 58. Release is effected by insertion of an unlocking key into keyhole 66 of the lock 60a.

I claim:

1. A cover for an open top, cargo-receiving truck body having a pair of opposed sidewalls and a pair of opposed end walls, said cover comprising:

a flexible panel adapted to span said open top thereabove side-to-side and end-to-end of the body, said panel having a tubular casing extending along said sidewalls and along said end walls exteriorly of the body below said top when the panel is in covering relationship to the top;

an elongated, flexible draw-element extending along said casing therewithin, said draw-element having a pair of terminal ends disposed in proximal relationship to each other exteriorly of the casing; and releasable means for attaching said terminal ends to the body with said draw-element drawn tightly around the side and end walls of the body.

2. The invention of claim 1, said terminal ends being closed loops in the draw-element, said releasable means receiving the loops.

3. The invention of claim 2, said panel having a pocket adjacent the ring provided with a pair of eyelets, said draw-element having terminal stretches extending from the casing, thence into the pocket and then through the eyelets, said loops being on said stretches and disposed exteriorly of the pocket.

4. The invention of claim 3, said body having a closed ring rigidly secured thereto, said releasable means receiving the ring.

5. The invention of claim 4, said releasable means being a padlock having a shackle receiving said loops.

6. The invention of claim 1, said panel having a pocket adjacent the ring provided with a pair of eyelets, said draw-element having terminal stretches extending from the casing, thence into the pocket and then through the eyelets, said releasable means being a lock rigidly secured to one of said stretches exteriorly of the pocket and adapted to receive the other of said stretches, said other stretch being releasable to an unlocked condition through use of a key.

7. The invention of claim 1, said releasable means being a lock rigidly secured to one of said terminal ends and adapted to receive the other of said terminal ends, said other terminal end being releasable to an unlocked condition only through use of a key.

8. The invention of claim 7, said body having a closed ring rigidly secured thereto and receiving said other terminal end.

9. The invention of claim 1; and a plurality of spaced, releasable devices along said walls and said casing, each having a part mounted on corresponding walls and a part attached to the casing.

10. The invention of claim 9, the devices being snap fasteners.

* * * * *